(12) United States Patent
Lewis et al.

(10) Patent No.: US 8,788,074 B1
(45) Date of Patent: Jul. 22, 2014

(54) ESTIMATING PLAYER SKILL IN GAMES

(71) Applicants: Justin Lewis, Marina Del Rey, CA (US); Thomas Kang, Santa Monica, CA (US)

(72) Inventors: Justin Lewis, Marina Del Rey, CA (US); Thomas Kang, Santa Monica, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/658,367

(22) Filed: Oct. 23, 2012

(51) Int. Cl.
*A63F 13/67* (2014.01)
*A63F 13/798* (2014.01)

(52) U.S. Cl.
USPC .................................................. 700/92

(58) Field of Classification Search
USPC ...................................... 700/91–93
See application file for complete search history.

(56) References Cited

U.S. PATENT DOCUMENTS

| | | | | |
|---|---|---|---|---|
| 6,824,462 | B2* | 11/2004 | Lydon et al. | 463/9 |
| 6,996,444 | B2* | 2/2006 | Ach, III | 700/91 |
| 7,050,868 | B1* | 5/2006 | Graepel et al. | 700/93 |
| 7,713,117 | B2* | 5/2010 | Graepel et al. | 463/9 |
| 7,778,866 | B2* | 8/2010 | Hughes | 705/7.42 |
| 7,840,288 | B2 | 11/2010 | Graepel et al. | |
| 8,175,726 | B2 | 5/2012 | Herbrich et al. | |
| 2002/0188361 | A1* | 12/2002 | Chudley et al. | 700/92 |
| 2005/0192097 | A1* | 9/2005 | Farnham et al. | 463/42 |
| 2006/0184260 | A1* | 8/2006 | Graepel et al. | 700/92 |
| 2007/0026934 | A1* | 2/2007 | Herbrich et al. | 463/23 |
| 2007/0112706 | A1* | 5/2007 | Herbrich et al. | 706/21 |
| 2007/0166680 | A1* | 7/2007 | Shibata et al. | 434/247 |
| 2009/0093287 | A1 | 4/2009 | Herbrich et al. | |
| 2009/0227313 | A1* | 9/2009 | Minka et al. | 463/14 |
| 2009/0319238 | A1* | 12/2009 | Bedard | 703/6 |

OTHER PUBLICATIONS

Elo Rating System, http://en.wikipedia.org/wiki/Elo_rating_system, downloaded on Oct. 23, 2012, pp. 1-25.
TruSkill, http://en.wikipedia.org/wiki/Trueskil, downloaded on Oct. 23, 2012, pp. 1-3.

* cited by examiner

*Primary Examiner* — William Brewster
*Assistant Examiner* — Jason Skaarup
(74) *Attorney, Agent, or Firm* — Remarck Law Group PLC

(57) ABSTRACT

A method, computer program product, and system is described. A score difference associated with an episode of a game is determined, wherein the score difference represents a difference between an actual score of a target player in the game episode and an actual score of a reference player in the game episode. A first adjusted score indicator associated with the game episode is determined, wherein the adjusted score indicator represents a sum of the score difference associated with the game episode and an estimated skill level of the reference player. An estimated skill level of the target player is determined, wherein the estimated skill level of the target player is based upon, at least in part, a weighted average of the first adjusted score indicator and one or more other adjusted score indicators.

17 Claims, 3 Drawing Sheets

ESTIMATING PLAYER SKILL IN GAMES

TECHNICAL FIELD

This disclosure relates to player skill in games.

BACKGROUND

Many individuals may engage in electronic games of various sorts. Certain electronic games may include one or more features whereby a score (or associated metric) associated with a player's performance in the game may be determined.

BRIEF SUMMARY OF THE DISCLOSURE

According to one aspect of the disclosure, a computer-implemented method includes determining, by the one or more computing devices, a score difference associated with an episode of a game, wherein the score difference represents a difference between an actual score of a target player in the game episode and an actual score of a reference player in the game episode. The method further includes determining, by the one or more computing devices, a first adjusted score indicator associated with the game episode, wherein the adjusted score indicator represents a sum of the score difference associated with the game episode and an estimated skill level of the reference player and wherein the estimated skill level of the reference player is based upon, at least in part, an iterative game skill estimation. The method further includes determining, by the one or more computing devices, a weighted average of the first adjusted score indicator and one or more other adjusted score indicators based upon, at least in part, applying a multiplier to the adjusted score indicator. The method further includes determining, by the one or more computing devices, an estimated skill level of the target player, wherein the estimated skill level of the target player is based upon, at least in part, the weighted average.

According to another aspect of the disclosure, a computer-implemented method includes determining, by one or more computing devices, a score difference associated with an episode of a game, wherein the score difference represents a difference between an actual score of a target player in the game episode and an actual score of a reference player in the game episode. The method further includes determining, by the one or more computing devices, a first adjusted score indicator associated with the game episode, wherein the adjusted score indicator represents a sum of the score difference associated with the game episode and an estimated skill level of the reference player. The method further includes determining, by the one or more computing devices, an estimated skill level of the target player, wherein the estimated skill level of the target player is based upon, at least in part, a weighted average of the first adjusted score indicator and one or more other adjusted score indicators.

One or more of the following features may be included. The estimated skill level of the reference player may be based upon, at least in part, an iterative game skill estimation. The method may include determining the weighted average based upon, at least in part, applying a multiplier to one or more of the score difference and the adjusted score indicator. The method may include determining the multiplier based upon, at least in part, determining a score volatility associated with one or more of the reference player and the target player. The method may include determining the multiplier based upon, at least in part, a number of game episodes that include both the target player and the reference player. The method may include determining the multiplier based upon, at least in part, determining one or more time periods during which the game episode is played. The method may include determining the multiplier based upon, at least in part, a number of players included in one or more teams associated with the game episode.

The method may include determining the multiplier based upon, at least in part, determining that the game episode was lost by the target player. The method may include determining the multiplier based upon, at least in part, determining that the first adjusted score indicator is greater than a previously-determined estimated skill of the target player. The method may include determining the multiplier based upon, at least in part, determining that the game episode was won by the target player. The method may include determining the multiplier based upon, at least in part, determining that the first adjusted score indicator is less than a previously-determined estimated skill of the target player.

According to another aspect of the disclosure, a computer program product resides on a computer readable storage medium and has a plurality of instructions stored on it. When executed by a processor, the instructions cause the processor to perform operations including determining a score difference associated with an episode of a game, wherein the score difference represents a difference between an actual score of a target player in the game episode and an actual score of a reference player in the game episode. The operations further include determining a first adjusted score indicator associated with the game episode, wherein the adjusted score indicator represents a sum of the score difference associated with the game episode and an estimated skill level of the reference player. The operations further includes determining an estimated skill level of the target player, wherein the estimated skill level of the target player is based upon, at least in part, a weighted average of the first adjusted score indicator and one or more other adjusted score indicators.

One or more of the following features may be included. The estimated skill level of the reference player may be based upon, at least in part, an iterative game skill estimation. The operations may include determining the weighted average based upon, at least in part, applying a multiplier to one or more of the score difference and the adjusted score indicator. The operations may include determining the multiplier based upon, at least in part, determining a score volatility associated with one or more of the reference player and the target player. The operations may include determining the multiplier based upon, at least in part, a number of game episodes that include both the target player and the reference player. The operations may include determining the multiplier based upon, at least in part, determining one or more time periods during which the game episode is played. The operations may include determining the multiplier based upon, at least in part, a number of players included in one or more teams associated with the game episode.

The operations may include determining the multiplier based upon, at least in part, determining that the game episode was lost by the target player. The operations may include determining the multiplier based upon, at least in part, determining that the first adjusted score indicator is greater than a previously-determined estimated skill of the target player. The operations may include determining the multiplier based upon, at least in part, determining that the game episode was won by the target player. The operations may include determining the multiplier based upon, at least in part, determining that the first adjusted score indicator is less than a previously-determined estimated skill of the target player.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

Like reference symbols in the various drawings indicate like elements.

DETAILED DESCRIPTION OF THE PREFERRED EMBODIMENTS

Figure 1:
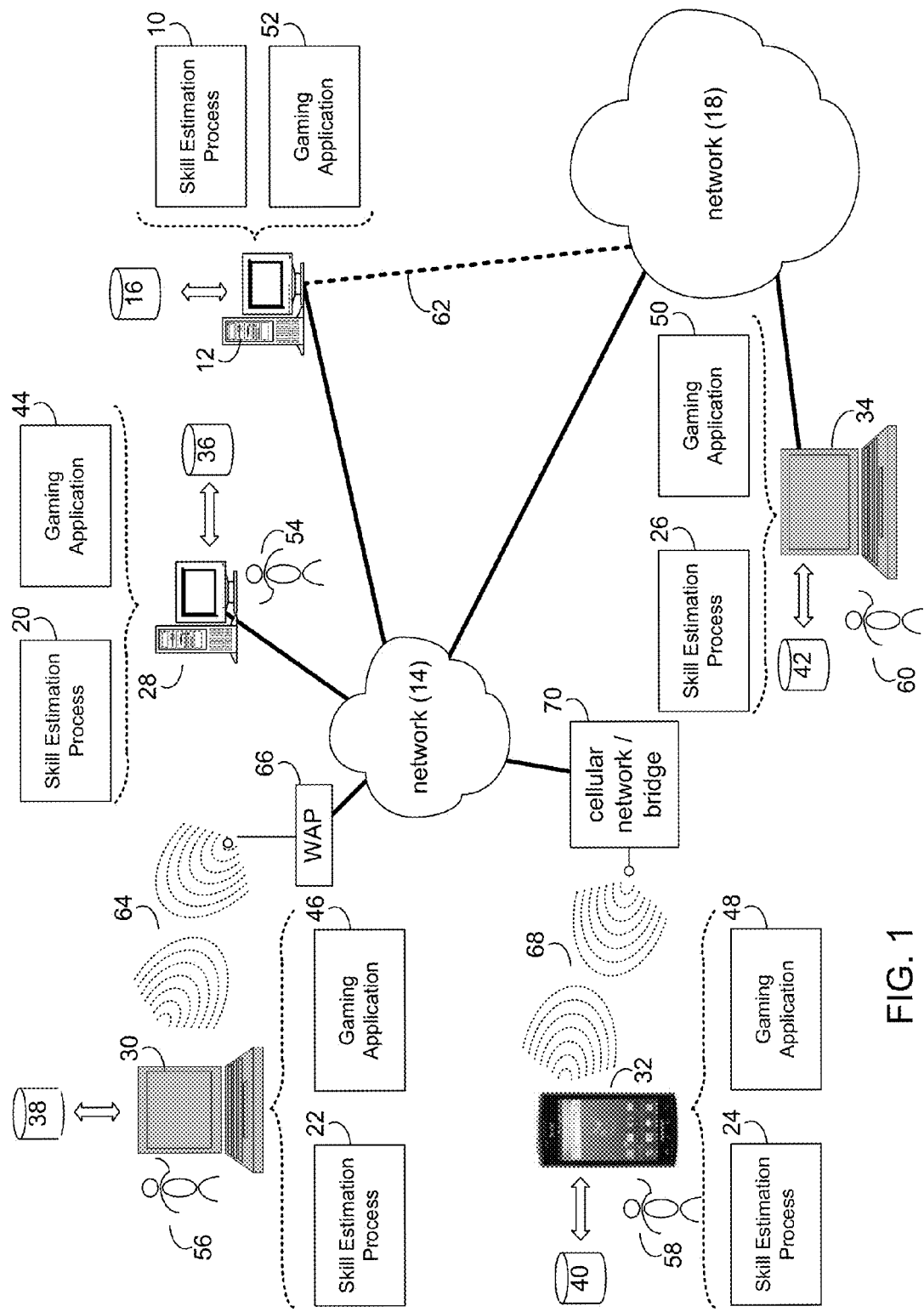
FIG. 1 is a diagrammatic view of a player skill estimation process coupled to a distributed computing network.

Individuals may access various electronic games for game play in a variety of ways, including, for example, through a gaming application ("GA"). A GA may, for example, be a web application or other application that facilitates one or more players engaging in a particular type of game play (e.g., as part of a particular game). A GA may include various functionality, some of which may relate to core game play and some of which may be ancillary to core game play. In certain embodiments, a GA may provide (or may facilitate providing) a score or other indicator of player skill and/or success. For example a GA may provide (based, for example, on a calculation internal to the GA or another calculation) a numerical indicator of a player's relative (or absolute) success in a particular episode of a game. Additionally/alternatively, a GA may provide a numerical indicator of a player's relative (or absolute) success over multiple episodes of a game. (As used herein, an "episode" will refer to a particular instance of playing a game.)

It may be useful, in certain embodiments, to determine (e.g., in addition to an actual score in a particular game) an estimated score (or "estimated skill") of a player. An estimated score (or skill) may indicate, for example, a score that a player may be expected to attain in a particular game. This may be useful, for example, in order to provide players with an indicator of relative skills among players. For example, a player with an estimated score of 100 may be able to determine, based on his estimated score, that he may not be a fairly matched opponent for a different player with, for example, a score of 50 or 150. In certain embodiments, estimating a players' skills may also be useful for intelligently matching opponents, teammates, collaborators, and so on within a game system.

In the context of a gaming application (e.g., as part of a GA or in conjunction with a GA), a player skill estimation ("PSE") process may, for example, enhance the overall gaming experience by determining estimations of player skill. In certain embodiments, a PSE process may a determine skill estimation for a target player based upon the actual scores of the player in one or more games already played, the estimated skill of opponents in those games, and various other factors. For example, for each of a set of episodes of a game that have been played by a target player, the difference(s) between the actual score of the target player in a particular episode and the actual score(s) of his opponent(s) in that episode may be calculated. The difference between a target player's score and an opponent's (or other player's) score in an episode may then be added to the estimated skill (i.e., expected score) of the opponent (or other player), thereby providing an adjusted indicator of the result of the particular episode (with respect to the opponent) that includes information based, for a particular episode or set of episodes, on both the performance of the target player and the estimated skill of the opponent. An average of all the adjusted indicators for the target player (e.g., the sum of the adjusted indicators for each opponent in each episode played) may be calculated and may inform an updated estimated skill for the target player (i.e., the expected score of the target player in the game). In certain embodiments, the average may be a weighted average, in which the adjusted indicator, parameters influencing the adjusted indicator, and/or other parameters, may be modified by a multiplier.

A PSE process may, for example, be run iteratively (i.e., as part of an iterative game skill estimation), with each successive iteration employing previously-determined updated estimated skills in order to increase the accuracy of the estimation. For example, in a first round of an iterative game skill estimation, a PSE process may determine an estimated skill for each of a cohort of players, based on actual scores in game episodes and previously-determined estimated skills. In a second (or later) round, the PSE process may utilize the estimated skills determined in the first (or other earlier) round, which may be a more accurate estimate of player skills, in order to further refine the calculation of estimated player skill (based, as noted above, on actual scores and reference estimated skills).

It will be understood that a PSE process may, in certain embodiments, in addition/as an alternative to determining estimation of player skill in games, be useful for determining the ordering of various types of items or indicators, wherein, for example, the comparisons between those items or indicators may be inconsistent or the value of those items or indicators may change over time.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to FIG. 1, a PSE process may be coupled to a computer or computer network. For example, server PSE process 10 may reside on and may be executed by server computer 12, which may be connected to network 14 (e.g., the Internet or a local area network). Examples of server computer 12 may include, but are not limited to: a personal computer, a server computer, a series of server computers, a mini computer, and/or a mainframe computer. Server computer 12 may be a web server (or a series of servers) running a network operating system, examples of which may include but are not limited to: Microsoft® Windows Server®; Novell® Netware®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.)

The instruction sets and subroutines of server PSE process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft® IIS, Novell® Web Server™, or Apache® Web Server, that allows for access to server computer 12 (via network 14) using one or more protocols, examples of which may include but are not limited to HTTP (i.e., HyperText Transfer Protocol), SIP (i.e., session initiation protocol), and the Lotus® Sametime® VP protocol. (Webserver is a trademark of Novell Corporation in the United States, other countries, or both; Apache is a registered trademark of Apache Software Foundation in the United States, other countries, or both; Lotus and Sametime are registered trademarks of International Business Machine Corp. in the United States, other countries, or both.) Network 14 may be connected to one or more secondary networks (e.g., network 18), examples of which may include but are not limited to: a local area network; a wide area network; or an intranet, for example.

Client PSE processes 20, 22, 24, 26 may reside on and may be executed by client electronic devices 28, 30, 32, and/or 34 (respectively), examples of which may include but are not limited to personal computer 28, laptop computer 30, a data-enabled mobile telephone 32, notebook computer 34, a personal digital assistant (not shown), a smart phone (not shown) and a dedicated network device (not shown), for example. Client electronic devices 28, 30, 32, 34 may each be coupled to network 14 and/or network 18 and may each execute an operating system, examples of which may include but are not limited to Microsoft® Windows®, Microsoft Windows CEO, Red Hat® Linux®, or a custom operating system.

The instruction sets and subroutines of client PSE processes 20, 22, 24, 26, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

In an embodiment, the PSE process may be a server-side process (e.g., which may be implemented via server PSE process 10), in which all of the functionality of the PSE process may be executed on a server computer (e.g., server computer 12). In an embodiment, the PSE process may be a client-side process (e.g., which may be implemented via one or more of client PSE processes 20, 22, 24, 26), in which all of the functionality of the PSE process may be executed on a client computing device (e.g., one or more of client electronic devices 28, 30, 32, 34). In an embodiment, the PSE process may be a hybrid server-client process (e.g., which may be implemented by server PSE process 10 and one or more of client PSE processes 20, 22, 24, 26), in which at least a portion of the functionality of the PSE process may be implemented via server computer 12 and at least a portion of the functionality of the PSE process may be implemented via one or more client computing devices (e.g., one or more of client electronic devices 28, 30, 32, 34).

A game application ("GA") may operate on a client device (e.g., client GA 44, operating on client electronic device 28; client GA 46, operating on client electronic device 30; client GA 48, operating on client electronic device 32; or client GA 50, operating on client electronic device 34). A client PSE process (e.g., client PSE process 20) or a server PSE process (e.g., server PSE process 10) may be in communication with a client GA (e.g., client GA 44) or may be part of a client GA. Further, in an embodiment a client PSE process may include a module and/or component of a client GA. In such an embodiment at least a portion of the functionality of the PSE process may be provided by the client GA.

A GA may additionally or alternatively operate on a server device (e.g., server GA 52, operating on server computer 12 or another server GA (not shown), operating on another server computer (not shown)). A server PSE process (e.g., server PSE process 10) or a client PSE process (e.g., client PSE process 20) may be in communication with a server GA (e.g., server GA 52) or may be a part of a server GA. Further, in an embodiment a server PSE process may include a module and/or a component of a server GA (or vice versa). In such an embodiment at least a portion of the functionality of the PSE process may be provided by the server GA (or vice versa).

Users 54, 56, 58, 60 may access a PSE process in various ways. For example, these users may access server PSE process 10 directly through the device on which a client process (e.g., client PSE processes 20, 22, 24, 26) is executed, namely client electronic devices 28, 30, 32, 34. Users 54, 56, 58, 60 may access server PSE process 10 directly through network 14 and/or through secondary network 18. Further, server computer 12 (i.e., the computer that executes server PSE process 10) may be connected to network 14 through secondary network 18, as illustrated with phantom link line 62. Users 54, 56, 58, 60 may also access a client or server GA in similar ways.

The various client electronic devices may be directly or indirectly coupled to network 14 (or network 18). For example, personal computer 28 is shown directly coupled to network 14 via a hardwired network connection. Further, notebook computer 34 is shown directly coupled to secondary network 18 via a hardwired network connection. Laptop computer 30 is shown wirelessly coupled to network 14 via wireless communication channel 64 established between laptop computer 30 and wireless access point ("WAP") 66, which is shown directly coupled to network 14. WAP 66 may be, for example, an IEEE 802.11a, 802.11b, 802.11g, 802.11n, Wi-Fi, and/or Bluetooth device that is capable of establishing wireless communication channel 64 between laptop computer 30 and WAP 66. Data-enabled mobile telephone 32 is shown wirelessly coupled to network 14 via wireless communication channel 68 established between data-enabled mobile telephone 32 and cellular network/bridge 70, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

For the following discussion, client PSE process 20 will be described for illustrative purposes. It will be understood that client PSE process 20 may, for example, interact and/or communicate with a server PSE process such as server PSE process 10 and/or may be executed within one or more applications that allow for communication with other server and/or client PSE processes. PSE process 20 may be utilized as part of or in conjunction with a variety of server and/or client GA applications, such as client GA 44 or server GA 52. In certain embodiments PSE process 20 may be utilized as part of or in conjunction with a variety of other consumption applications and/or communication applications (not shown), facilitating consumption of content and/or communication among individuals and/or groups. This is not intended to be a limitation of this disclosure, as other configurations are possible. For example, some implementations may include one or more of client PSE processes 22, 24, 26 or server PSE process 10 in place of or in addition to client PSE process 20. Additionally/alternatively, PSE process 20 may include stand-alone client processes and/or stand-alone server processes, PSE process may be utilized as part of or in conjunction with client GA 46, 48, 50 or another server GA or other applications (not shown), and so on.

Figure 2:
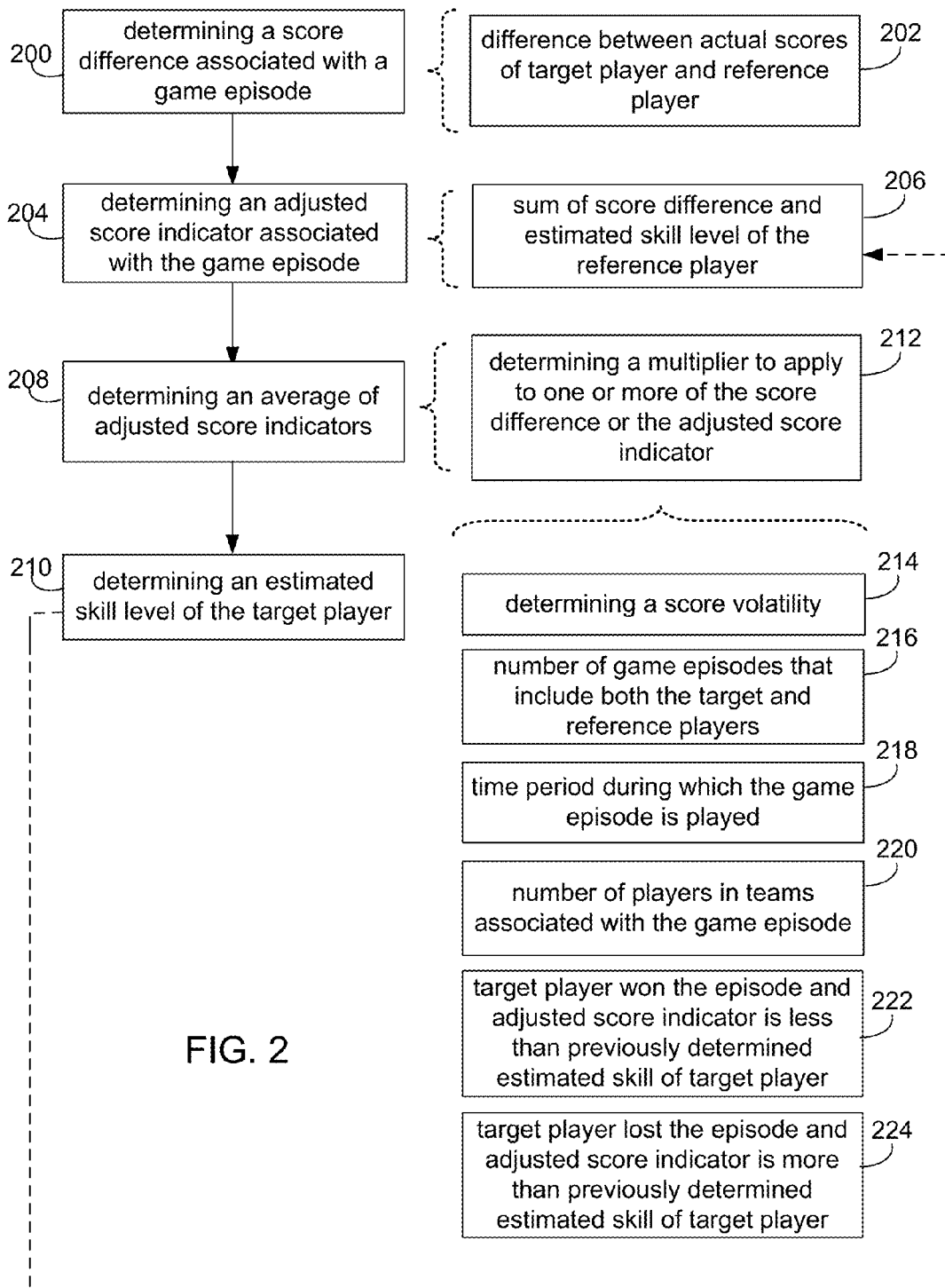
FIG. 2 is a flowchart of a process executed by the player skill estimation process of FIG. 1.

Referring now also to FIG. 2, there is shown a diagrammatic view of an example process that may be implemented by a PSE process, e.g., client PSE process 20. PSE process 20 may determine 200 a score difference associated with an episode of a game. For example, PSE process 20 may determine 200 the difference 202 between the actual score of a target player in the episode and another player participating in that episode (i.e., a "reference player"). This may be represented, for example, for an episode "i" as $$\text{outcome}_i = \text{score}_i - \text{score2}_i \qquad (1)$$

wherein "outcome" indicates the difference 202 between the actual score in an episode of the target player ("$\text{score}_i$") and the actual score in the episode of a reference player ("$\text{score2}_i$"). In certain embodiments, a reference player may be associated with the target player based on being an opponent of the target player, being a collaborator or team-mate of the target player, and/or other factors.

It will be understood that in this calculation (and others), episodes including multiple reference players (e.g., team-based episodes) and/or other episodes may, in certain embodiments, be effectively counted as multiple episodes "i." For example, for an episode in which a target player plays against three reference opponents, in certain embodiments PSE process 20 may treat that episode as, effectively, three separate episodes "i," against three individual reference opponents. Accordingly, operations spanning all episodes "i" (e.g., determination 200 of outcome, for all episodes "i") may sometimes include multiple related operations (e.g., multiple determinations 200 of outcome) associated with each such episode. For example, continuing the example above, PSE process may determine 200 three separate score differences for the multi-player episode including the three reference players.

It will also be understood that in certain embodiments, for certain calculations, PSE process 20 may treat multiple episodes as a single effective episode. For example, if a target player has played a particular reference player in three distinct, but related, mini-episodes, in certain embodiments, PSE process 20 may treat the three mini-episodes as effectively representing a single full episode. As such, for example, PSE process 20 may determine 200 a single score difference associated with all three mini-episodes in addition/as an alternative to determining 200 three separate score differences, each associated with a single mini-episode.

In certain games, certain episodes may not include numerical scores associated with player performance. For example, certain games may simply be won or lost, having no explicit scoring to compare relative performance. In such a case, for example, PSE process 20 may assign a reference score associated with a win (and/or a tie or loss) and/or various episode parameters associated with a win (and/or a tie or loss). For example, in certain embodiments a player winning, tying, or losing an episode may be determined to have a score of 2, 1 or 0, respectively. In certain embodiments, a player winning (or losing) an episode with a favorable strategy, in a certain amount of time, with a favored style, and so on, may be determined to have a higher score than a player who wins (or loses) an episode with a less favorable strategy, in a different amount of time, with a less favored style, and so on. It will be understood that numerical scores may be determined for game play in a variety of ways.

PSE process 20 may determine 204 an adjusted score indicator associated with a game episode. For example, PSE process 20 may determine 204 the sum 206 of determined 200 difference 202 and an estimated skill level of a target player, as determined, for example through a previous iteration of PSE process 20 (i.e., through an iterative game skill estimation). This may be represented, for example, for episode "i" as $$\text{adj\_score\_indicator}_i = \text{outcome}_i + \text{estimated\_reference\_skill} \quad (2)$$

wherein "adj_score_indicator" indicates the adjusted score indicator, equal to the sum of the "outcome$_i$" (as, for example, in equation (1), above) and the estimated skill level of the relevant reference player ("estimated_reference_skill"). In this way, for example, the determined 204 adjusted score indicator may represent the actual score difference of a game episode scaled by the expected skill level (i.e., expected score) of a reference player participating in the episode (e.g., the reference player with respect to which outcome$_i$ was determined 200). This may for example, assist PSE process 20 in calculating an estimated skills for a target player that accounts for scores of the target player as well as the skill level of relevant reference players (e.g., the opponents, team members, collaborators, and so on, of the target player).

For example, if a target player plays against a weaker reference player in a particular episode, the target player may accumulate a very high (winning) score with respect to that reference player and, accordingly, PSE process 20 may determine 200 a large (and positive) actual score difference 202. In another episode, however, the target player may play against a stronger reference player and may accumulate a smaller (but still winning) score with respect to that reference player. Accordingly, PSE process 20 may determine 200 a smaller (but still positive) actual score difference 202.

In certain embodiments, however, winning against the stronger player may represent a greater accomplishment than winning against the weaker player, even though the difference 202 between the actual scores in the respective episodes may (in isolation) suggest that the target player performed objectively better against the weaker player. PSE process 20 may account for this fact, for example, by respectively determining 204 a sum 206 of the score difference with the estimated skill level of the reference player (e.g., as in equation (2), above). In this way, for example, and continuing the example above, in the determined 204 adjusted score indicator for the first episode, the effects of the high actual score difference may be offset by the effects of a lower estimated skill level for the weaker reference player. Similarly, in the determined 204 adjusted score indicator for the second episode, the effects of the low actual score difference may be offset, for example, by the effects of a higher estimated skill level for the stronger reference player.

For example, a target player may beat a first reference player 52-10, where the first reference player has an estimated skill level of 10 (i.e., is a weaker player), and the target player may beat a second reference player 75-70, where the second reference player has an estimated skill level of 80 (i.e., is a stronger player). Accordingly, PSE process 20 may determine 204 an adjusted score indicator of 52 (i.e., 42+10) for the first episode and may determine an adjusted score indicator of 85 (i.e., 5+80) for the second episode. In this way, for example, PSE process 20 may, in determining 204 adjusted score indicators, account for the fact that the close victory over the stronger player may sometimes indicate a more notable success than the less close victory over the weaker player and should therefore, in certain embodiments, contribute more to increasing the estimated skill of the target player.

In certain embodiments, PSE process 20 may provide a similar benefit with respect to, for example, games that the target player loses. For example, in a particular game episode the target player may play against a very strong reference player (i.e., a reference player with a high estimated skill level) and may lose by a large number of points. In such a case, the difference 202 between the actual scores may be negative (i.e., because the target player's score is less than the reference player's score). Accordingly, the difference 202 (e.g., outcome, in equation (1), above) will act to reduce the determined 204 adjusted score indicator (e.g., as in equation (2), above). However, this reduction may be offset, for example, by the high estimated skill level of the reference player. For example, in a particular episode a target player may lose to a reference player 45-10, wherein the reference player is a highly skilled player (e.g., has an expected skill of 120). In this example, PSE process 20 may determine 204 an adjusted score indicator of 85 (i.e., (−35)+120), which may, as per the example above, represent the same adjusted score indicator value as the win of 75-70 over a less skilled reference player (i.e., a reference player with estimated skill of 80).

PSE process 20 may determine 208 an average of adjusted score indicators for a set of episodes. This may be represented, for example as $$\text{avg\_adj\_indicator} = \Sigma(\text{adj\_score\_indicator}_i)/N \quad (3)$$

wherein the average adjusted score indicator ("avg_adj_indicator") is equal to the sum over all relevant episodes "i" of the adjusted score indicator divided by the total number of relevant episodes ("N"). For example, PSE process 20 may determine 204 adjusted score indicators for each (or a subset) of episodes of a game or games that a target player has engaged in and may determine 208 an average of those adjusted score indicators. In certain embodiments, PSE process 20 may determine 210 an estimated skill of the target player based upon, at least in part, the determined 208 average. In certain embodiments, for example, PSE process 20 may determine 210 the estimated skill level (or "estimated skill") of the target player as being equal to the determined 208 average. This may be represented, for example, as $$\text{target\_est\_skill} = \text{avg\_adj\_indicator} \quad (4)$$

wherein the estimated target skill level is represented by "target_est_skill." As such, continuing the examples above, PSE process 20 may determine 210, for the three described episodes, that the target player has an estimated skill level of 74 (i.e., the average of 85, 85 and 52).

As also noted above, it will be understood that in these (and other) calculations, certain episodes, such as those including multiple reference players, may be effectively counted as multiple episodes "i." Accordingly, in certain embodiments, operations such as summations over all episodes "i" (e.g., determining 208 avg_adj_indicator as in equation (3), above) may include multiple addends (e.g., multiple instances of $\text{adj\_score\_indicator}_i$) associated with a single game episode—e.g., an addend for each reference player included in each such episode. Additionally/alternatively, as also noted above, certain sets of episodes may be treated as though representing only a single episode.

In certain embodiments, PSE process 20 may run iteratively and/or continuously in order, for example, to better estimate skill levels for various target players. For example, PSE process 20 may run continuously (or near-continuously) while a game is available to be played, while a target player (and/or reference player) is signed into a game episode or game forum, and so on. In certain embodiments, PSE process 20 may run whenever a game episode involving a target player and/or a reference player is started, completed, in progress, and/or at a certain stage. For example, in certain embodiments, PSE process 20 may run every time a certain number of points is scored in an episode (or episodes) or every time the lead changes in an episode or episodes, and so on.

Running PSE process 20 iteratively may be useful because each iteration of the process may further refine the comparative determination of a target player's skill estimation. For example, in certain embodiments it may be useful to run PSE process 20 with respect to a target player even if the target player has not played in any episodes since the last time PSE process 20 determined 210 an estimated skill level for that player. For example, even though a target player may not have played in any new episodes, the reference players against which the target player may be measured (or the reference players against which those reference players may be measured, when those reference players are treated by PSE process 20 as target players, and so on) may have played in additional episodes (or engaged in other actions) that may have changed the determined 210 estimated skill of the reference players (or the reference players against which those reference players are measured, and so on). In this way, for example, PSE process 20 may facilitate determining 210 estimated skill levels of target players that accurately reflect the skill levels of the reference players with which the target player is being compared.

In certain embodiments, where no estimated skill is available for one or more reference and/or target players, PSE process 20 may treat the estimated skill for those players as zero (or another initial estimated skill) until an estimated skill may be otherwise calculated.

In certain embodiments, PSE process 20 may be utilized to determine 210 a historical estimated skill level of a target player. For example, in addition/as an alternative to determining 210 an estimated skill level of a target player at the present time, PSE process 20 may determine 212 an estimated skill level of a target player at some time in the past. As such, for example, the determined 208 average of adjusted score indicators may include only episodes falling before the target historical date and/or only episodes falling within a particular period around the target historical date. In certain embodiments, in determining 210 a historical estimated skill level, PSE process 20 may utilize current estimated skill levels of reference players (i.e., may determine 210 a historical estimated skill level for the target player with respect to the current abilities of potential opponents/teammates/etc. of the target player) and/or may utilize historical estimated skill levels of reference players (i.e., may determine 210 a historical estimated skill level for the target player with respect to the historical abilities of potential opponents/teammates/etc. of the target player).

In certain embodiments, PSE process 20 may determine 210 estimated skill levels for target players participating in team episodes of games (i.e., episodes in which one or more players participate as members of one or more teams). PSE process 20 may determine 210 estimated skill levels for players participating in team episodes in a variety of ways. For example, PSE process 20 may determine 204 adjusted score indicators for a variety of player pairings. In certain embodiments, PSE process 20 may determine 204 adjusted score indicators based on determining 200 differences 202 between scores of a target player and every other player participating in the team episode. In certain embodiments, PSE process 20 may determine 204 adjusted score indicators for a target player based on determining 200 differences 202 between scores of the target player and reference players who are the target player's teammates. In certain embodiments, PSE process 20 may determine 204 adjusted score indicators for a target player based on determining 200 differences 202 between scores of the target player and reference players who are on opposing (and/or cooperating) other teams. In certain embodiments, PSE process 20 may determine 204 adjusted score indicators for a target player based on determining 200 differences 202 between team scores of the target player's team and other teams participating in the episode. In such a case, for example, determining 204 an adjusted score indicator may be based upon a estimated skill level of all players on the other team (e.g., an average, or weighted average of those estimated skill levels).

PSE process 20 may determine 208 an average of adjusted score indicators as a weighted average based upon, for example, applying a determined 212 multiplier to the actual score difference, the estimated skill level of the reference player, the adjusted score indicator, and/or other parameters. This may be represented, for example, as $$\text{avg\_adj\_indicator} = \Sigma(\text{adj\_score\_indicator}_i * M_i)/\Sigma(M_i) \quad (5)$$

wherein the average adjusted score indicator ("avg_adj_indicator") is equal to the sum over all relevant episodes of the product of each adjusted score indicator and its respective multiplier ("$M_i$"), divided by the sum of the multipliers. In certain embodiments, until otherwise modified by PSE process 20, the default value of $M_i$ may be 1.

PSE process 20 may determine 212 a multiplier in a variety of ways. For example, PSE process 20 may determine 212 the multiplier based on determining 214 a score volatility associated with the target and/or reference player(s). In certain embodiments, PSE process may apply a multiplier that reduces the importance, in the determined 208 average, of episodes involving players with high score volatility. For example, certain players may exhibit high volatility in scores, as may be evidenced, for example, based on determining that the standard deviation of a player's actual (or estimated) scores in games (and/or the difference 202 between the player's actual (or estimated) scores and various reference players' scores) is large compared to the average standard deviations of other players. In certain embodiments, the volatility of a target player may be based upon an estimated target score standard deviation, which may be calculated, for example, as the square root of the sum over relevant episodes of the squared difference between the adjusted score indicator for each episode and the expected skill level of the target player. This may be represented, for example, as $$\text{estimated\_target\_stdev} = (\Sigma(\text{adj\_score\_indicator}_i - \text{target\_est\_skill})^2)^{1/2} \quad (6)$$

wherein the estimated skill of the target may be derived, for example, from previous iterations of PSE process 20 (and/or otherwise estimated).

In certain embodiments, PSE process 20 may utilize the estimated target score standard deviation (e.g., "estimated_target_stdev") in order to determine 214 a score volatility. For example PSE process may compare the estimated target score standard deviation with the average score standard deviation across multiple reference players (e.g., "system_avg_stdev"–an average of the results of applying equation 6 to each of a cohort of players associated with a game) in order to determine whether the target player is more (or less) volatile than the average system player. PSE process 20, in certain embodiments, may determine 212 a multiplier based on this comparison. This may be represented, for example, as $$M_i = (\text{estimated\_target\_stdev}/\text{system\_avg\_stdev})^{-1} \quad (7)$$

wherein the multiplier is the inverse of the ratio of the estimated target score standard deviation to the average system score standard deviation. In this way, for example, the determined 212 multiplier may be large for players with low score-related standard deviations and small for players with high score-related standard deviations (as compared with the average standard deviation for, e.g., all players of the game).

In certain embodiments, PSE process 20 may implement various limits on a multiplier (e.g., on a multiplier determined 212 based on determining 214 score volatility). For example, in certain embodiments, a multiplier determined 212 based on determining 214 score volatility may be limited to be no smaller than a particular value and/or the ratio of the estimated target standard deviation to the system average standard deviation may be ignored if larger than a particular value (e.g., if the estimated target standard deviation is smaller than the system average standard deviation). This may be represented, fore example, as $$M_i = \min(3.0, (\max(1.0, (\text{estimated\_target\_stdev}/\text{system\_avg\_stdev})))^{-1} \quad (8)$$

wherein the multiplier is limited to be no smaller than ⅓ and the effect of volatility is ignored if the ratio of the estimated target standard deviation to the system average standard deviation is less than one (i.e., if the target player is less volatile than the system average). It will be understood that various other parameters may modify this calculation, and that various other calculations of a volatility-based multiplier may be possible.

The operations above may be useful, for example, because high volatility associated with a player's score may indicate that results of episodes involving that player may not be strongly indicative of actual (and/or predictable) skill. The value of such a multiplier may be constant in certain embodiments. In certain embodiments, the value of such a multiplier may be dynamic. For example, in certain embodiments, PSE process 20 may determine 214 score volatility based on calculating a standard deviation (or other statistical measure) of a reference player's score and determining 212 a multiplier scaled to reflect the relative value of that standard deviation. In this way, for example, a smaller multiplier (i.e., a multiplier that more strongly reduces the contribution of an episode to a determined 208 weighted average)) may be used with respect to episodes involving highly volatile players, while a larger multiplier (i.e., a multiplier that less strongly reduces the contribution of an episode) may be used with respect to episodes involving less volatile players.

In certain embodiments, to reflect the uncertainty associated with new (or otherwise unknown) players, PSE process 20 may determine 214 a score volatility for such players by assuming a particular estimated score standard deviation of the players' skill (e.g., a high standard deviation) until the players have engaged in sufficient episodes to render a traditionally calculated standard deviation meaningful. For example, in certain embodiments, PSE process 20 may assume a standard deviation of 100 for players that have engaged in less than 15 episodes, but may directly calculate a standard deviation from a player's score (or estimated skill) once the player has engaged in 15 or more game episodes.

In certain embodiments, PSE process 20 may utilize various standard deviations and/or determined 214 score volatilities in other ways. For example, PSE process 20 may ignore or may assign a small multiplier to episodes in which a target player's score indicates a performance diverging from the target player's average by a certain number of standard deviations. This may be represented in part, for example by analysis of the inequality $$|(\text{adj\_score\_indicator}_i - \text{target\_est\_skill})| > \text{estimated\_target\_stdev} * \alpha \quad (9)$$

wherein PSE process 20 may, for example, ignore a particular adjusted score indicator (e.g., adj_score_indicator$_i$) if the absolute value of the difference between that adjusted score indicator and the estimated target skill (e.g., target_est_skill) exceeds the standard deviation of the target (e.g., estimated_target_stdev as calculated in equation (6), above) multiplied by an adjustable parameter ($\alpha$).

PSE process 20 may determine 212 a multiplier based on a number of game episodes 216 that include both the target and reference players. For example, in certain embodiments, it may be useful to assign lower weight in the determined 208 weighted average for repeated episodes featuring the same set of players. For example, score information for a target player associated with 100 different episodes against 100 different reference players may be more useful information for determining 210 useful estimated skill levels than score information for a target player associated with 100 different episodes against only a single reference player. Accordingly, in certain embodiments, PSE process 20 may produce more useful determinations 210 of estimated skill if it determines 212 the multiplier based on the number of games 216 that include both the target player and a particular reference player (or players). This may be represented, for example, by $$M_i = (\text{games\_against\_ref}_i)^{-x} \quad (10)$$

wherein the multiplier for a particular episode "i" may equal the total number of episodes played by the target player against a reference player associated with episode "i" (i.e., "games_against_ref$_i$") raised to the (-x) power. In order to appropriately discount the value of episodes played against a common opponent, "x" may, for example, be set to a positive value less than one.

In certain embodiments, PSE process 20 may determine 212 a multiplier based on various information associated with a team episode, including, for example, the number of players 220 in teams associated with the team episode. For example, if a target player has participated in a team episode involving 16 total players, PSE process 20 may determine 212 a multiplier equal to $\frac{1}{16}$. In this way, for example, the actual contribution of the target player to the team episode may be approximated in determining 208 a weighted average of adjusted score indicators. In certain embodiments, PSE process 20 may determine 212 a multiplier based on other information such as, for example, the amount of time in a team episode in which the target (and/or reference) player actually participate, the percentage of time in a team episode in which the target (and/or reference) player actually participate, the relative performance of a target (and/or reference) player (e.g., points scored per minute played), and so on.

PSE process 20 may determine 212 a multiplier in such a way as to mitigate the effect of wins by a target player that would tend to decrease the estimated skill level of the target player and/or the effect of losses by the target player losses that would tend to increase the estimated skill level of the target player. For example, in certain episodes, a target player may heavily outmatch an opponent reference player and may "take it easy" on the reference player. Such an outcome, if unmodified, may result in an adjusted score indicator that is lower than a previously-determined 210 estimated skill level of the target player (i.e., that could contribute to a decrease in the target player's determined 210 estimated skill level, even though the target player won the episode). Additionally/alternatively, in certain episodes, a target player may be heavily outmatched by an opponent reference player and the reference player may "take it easy' on the target player. Such an outcome may, if not modified, result in an adjusted score indicator that is higher than a previously-determined 210 estimated skill level of the target player (i.e., that could contribute to an increase in the target player's determined 210 estimated skill level, even though the target player lost the episode).

To mitigate these possible effects, for example, PSE process 20 may determine 212 a multiplier based on determining 222 that the target player won the episode and that the adjusted score indicator for the won episode is lower than a previously-determined estimated skill level of the target player. As such, PSE process 20 may determine 208 a weighted average of adjusted score indicators in which this outcome (i.e., this adjusted score indicator) is assigned a lower weight (e.g., based on the determined 212 multiplier). Additionally/alternatively PSE process 20 may determine 212 a multiplier based on determining 224 that the target player lost the episode and that the adjusted score indicator for the lost episode is higher than a previously-determined estimated skill level of the target player. As such, PSE process 20 may determine 208 a weighted average of adjusted score indicators in which this anomalous outcome (i.e., this adjusted score indicator) is assigned a lower weight (e.g., based on the determined 212 multiplier).

PSE process 20 may also moderate determining 210 an estimated skill level based on the timing of game episodes. For example, in certain embodiments, PSE process 20 may determine 212 a multiplier based upon, at least in part, one or more time periods during which a game episode has been played. For example, in certain embodiments, when determining 204 various adjusted score indicators, PSE process 20 may ignore (or otherwise discount) episodes outside a particular time frame. For example, in determining 210 a current estimated skill level PSE process 20 may ignore game episodes occurring more than two years in the past, and/or, in determining 210 a historical estimated skill level, may ignore game episodes occurring more than, for example, four months before (and/or after) the target historical date. In certain embodiments, PSE process 20 may determine 212 a multiplier based on the timing of game episodes (i.e., may moderate score differences, adjusted score indicators, estimated skill levels, and so on, using a multiplier that is determined 212 based on the time period during which a particular episode was played). For example, PSE process 20 may determine 212 a multiplier for a particular adjusted score indicator that decays exponentially based on the length of time before the current time a the episode associated with the adjusted score indicator was played.

It will be understood that in certain embodiments the multipliers discussed above (and various others) may be utilized by PSE process 20 to determine 208 a weighted average alone or in various combinations with each other (and/or other parameters). For example, PSE process 20 may determine 212 a multiplier that is the product of various multipliers based, respectively, on determining 214 score volatility, determining the number of players 220 on teams involved in an episode, and determining that the relevant episode is two years in the past. It will be understood that various combinations of determined 212 multipliers (e.g., products, averages, weighted averages, weighted products, and so on) may be utilized.

Figure 3:
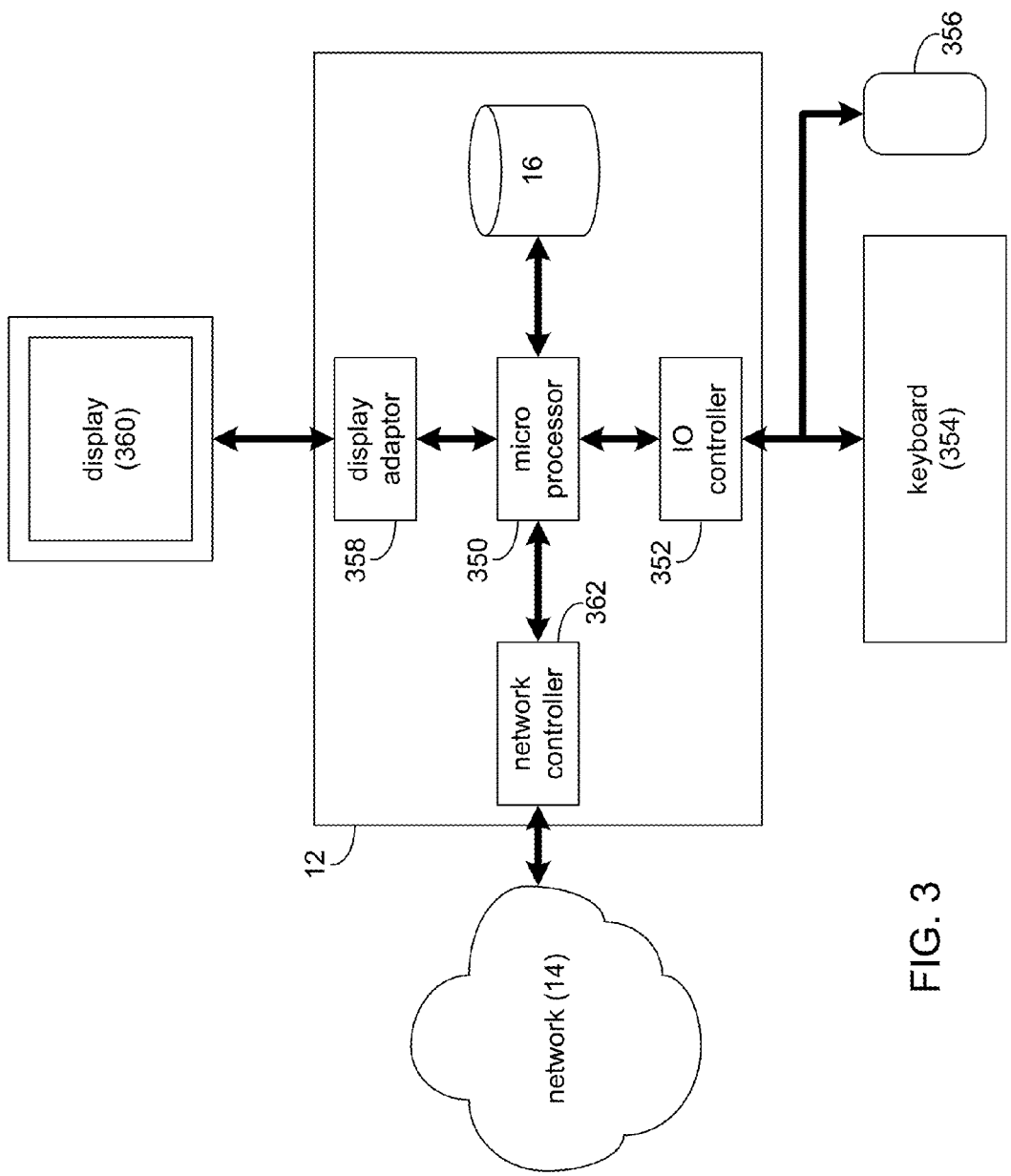
FIG. 3 is a diagrammatic view of a computing system that may execute or be utilized by the player skill estimation process of FIG. 1.

Referring also to FIG. 3, there is shown a diagrammatic view of an example computing system included in server computer 12. While computing system 12 is shown in this figure, this is for illustrative purposes only and is not intended to be a limitation of this disclosure, as other configuration are possible. For example, any computing device capable of executing, in whole or in part, a PSE process (e.g., PSE process 10, 20, 22, 24, or 26) may be substituted for the computing system 12 within FIG. 3, examples of which may include but are not limited to client electronic devices 28, 30, 32, 34.

Computing system 12 may include microprocessor 350 configured to e.g., process data and execute instructions/code for group profile process 10. Microprocessor 350 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 352 may be configured to couple microprocessor 350 with various devices, such as keyboard 354, mouse 356, USB ports (not shown), printer ports (not shown) and/or various other input devices (not shown), such as touch-screen, motion-sensing, and other devices. Display adaptor 358 may be configured to couple display 360 (e.g., a CRT or LCD monitor) with microprocessor 350, while network adapter 362 (e.g., an Ethernet adapter) may be configured to couple microprocessor 350 to network 14 (e.g., the Internet or a local area network).

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of embodiments and implementations have been described. Nevertheless, it will be understood that various modifications may be made. Accordingly, other embodiments and implementations are within the scope of the following claims.

What is claimed is:

1. A computer-implemented method comprising:
   determining, by one or more computing devices, a score difference associated with an episode of a game, wherein the score difference represents a difference between an actual score of a target player in the game episode and an actual score of a reference player in the game episode;
   determining, by the one or more computing devices, a first adjusted score indicator associated with the game episode, wherein the adjusted score indicator represents a sum of the score difference associated with the game episode and an estimated skill level of the reference player and wherein the estimated skill level of the reference player is based upon, at least in part, an iterative game skill estimation;
   determining, by the one or more computing devices, a weighted average of the first adjusted score indicator and one or more other adjusted score indicators based upon, at least in part, applying a multiplier to the adjusted score indicator; and
   determining, by the one or more computing devices, an estimated skill level of the target player, wherein the estimated skill level of the target player is based upon, at least in part, the weighted average.

2. A computer-implemented method comprising:
   determining, by one or more computing devices, a score difference associated with an episode of a game, wherein the score difference represents a difference between an actual score of a target player in the game episode and an actual score of a reference player in the game episode;
   determining, by the one or more computing devices, a first adjusted score indicator associated with the game episode, wherein the adjusted score indicator represents a sum of the score difference associated with the game episode and an estimated skill level of the reference player;
   determining, by the one or more computing devices, an estimated skill level of the target player, wherein the estimated skill level of the target player is based upon, at least in part, an average of the first adjusted score indicator and one or more other adjusted score indicators; and
   determining the average as a weighted average based upon, at least in part, applying a multiplier to one or more of the score difference and the adjusted score indicator.

3. The computer-implemented method of claim 2 wherein the estimated skill level of the reference player is based upon, at least in part, an iterative game skill estimation.

4. The computer-implemented method of claim 2 further comprising:
   determining the multiplier based upon, at least in part, determining a score volatility associated with one or more of the reference player and the target player.

5. The computer-implemented method of claim 2 further comprising:
   determining the multiplier based upon, at least in part, a number of game episodes that include both the target player and the reference player.

6. The computer-implemented method of claim 2 further comprising:
   determining the multiplier based upon, at least in part, determining one or more time periods during which the game episode is played.

7. The computer-implemented method of claim 2 further comprising:
   determining the multiplier based upon, at least in part, a number of players included in one or more teams associated with the game episode.

8. The computer-implemented method of claim 2 further comprising:
   determining the multiplier based upon, at least in part:
      determining that the game episode was lost by the target player; and
      determining that the first adjusted score indicator is greater than a previously-determined estimated skill of the target player.

9. The computer-implemented method of claim 2 further comprising:
   determining the multiplier based upon, at least in part:
      determining that the game episode was won by the target player; and
      determining that the first adjusted score indicator is less than a previously-determined estimated skill of the target player.

10. A computer program product residing on a non-transitory computer readable medium having a plurality of instructions stored thereon, which, when executed by a processor, cause the processor to perform operations comprising:
   determining, by the one or more computing devices, a score difference associated with an episode of a game, wherein the score difference represents a difference between an actual score of a target player in the game episode and an actual score of a reference player in the game episode;

determining, by the one or more computing devices, a first adjusted score indicator associated with the game episode, wherein the adjusted score indicator represents a sum of the score difference associated with the game episode and an estimated skill level of the reference player;

determining, by the one or more computing devices, an estimated skill level of the target player, wherein the estimated skill level of the target player is based upon, at least in part, an average of the first adjusted score indicator and one or more other adjusted score indicators; and determining the average as a weighted average based upon, at least in part, applying a multiplier to one or more of the score difference and the adjusted score indicator.

11. The computer program product of claim 10 wherein the estimated skill level of the reference player is based upon, at least in part, an iterative game skill estimation.

12. The computer program product of claim 10 wherein the operations further comprise:
determining the multiplier based upon, at least in part, determining a score volatility associated with one or more of the reference player and the target player.

13. The computer program product of claim 10 wherein the operations further comprise:
determining the multiplier based upon, at least in part, a number of game episodes that include both the target player and the reference player.

14. The computer program product of claim 10 wherein the operations further comprise:
determining the multiplier based upon, at least in part, determining one or more time periods during which the game episode is played.

15. The computer program product of claim 10 wherein the operations further comprise:
determining the multiplier based upon, at least in part, a number of players included in one or more teams associated with the game episode.

16. The computer program product of claim 10 wherein the operations further comprise:
determining the multiplier based upon, at least in part:
determining that the game episode was lost by the target player; and
determining that the first adjusted score indicator is greater than a previously-determined estimated skill of the target player.

17. The computer program product of claim 10 wherein the operations further comprise:
determining the multiplier based upon, at least in part:
determining that the game episode was won by the target player; and
determining that the first adjusted score indicator is less than a previously-determined estimated skill of the target player.

* * * * *